US010807646B2

(12) United States Patent
Sakata et al.

(10) Patent No.: US 10,807,646 B2
(45) Date of Patent: Oct. 20, 2020

(54) FRONTAL VEHICLE STRUCTURE AND METHOD FOR MANUFACTURING FRONTAL VEHICLE STRUCTURE

(71) Applicants: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

(72) Inventors: Yasuhiro Sakata, Kariya (JP); Kosei Ota, Okazaki (JP); Koichi Enoki, Toyota (JP)

(73) Assignees: KABUSHIKI KAISHA TOYOTA JIDOSHOKKI, Kariya-shi, Aichi-ken (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 79 days.

(21) Appl. No.: 16/278,834

(22) Filed: Feb. 19, 2019

(65) Prior Publication Data
US 2019/0256148 A1    Aug. 22, 2019

(30) Foreign Application Priority Data

Feb. 20, 2018    (JP) .................................. 2018-027947

(51) Int. Cl.
*B62D 21/15*    (2006.01)
*B62D 25/08*    (2006.01)
*B62D 25/04*    (2006.01)

(52) U.S. Cl.
CPC ........... *B62D 21/152* (2013.01); *B62D 21/15* (2013.01); *B62D 25/04* (2013.01); *B62D 25/081* (2013.01)

(58) Field of Classification Search
CPC ...... B62D 21/152; B62D 21/15; B62D 25/04; B62D 25/081
See application file for complete search history.

(56) References Cited

U.S. PATENT DOCUMENTS

| 2015/0344071 | A1* | 12/2015 | Nakano | .................. | B62D 25/04 296/187.09 |
| 2016/0052554 | A1* | 2/2016 | Ozawa | .................. | B62D 25/082 296/187.09 |
| 2020/0047696 | A1* | 2/2020 | Atsumi | .................. | B60R 19/34 |

FOREIGN PATENT DOCUMENTS

| JP | 9-207816 A | 8/1997 |
| JP | 10-53159 A | 2/1998 |
| JP | 2008-137483 A | 6/2008 |

* cited by examiner

*Primary Examiner* — Lori L Lyjak
(74) *Attorney, Agent, or Firm* — Sughrue Mion, PLLC

(57) ABSTRACT

A suspension tower is coupled to a front side member at a portion of the front side member located frontward from a front pillar. A frontal vehicle structure includes a coupling member including a front end coupled to the suspension tower and a rear end coupled to the front pillar. The coupling member includes an outer panel and an inner panel that form a closed cross-sectional structure. The outer panel includes a weak portion arranged between a joined portion of the coupling member joined to the suspension tower and a joined portion of the coupling member joined to the front pillar.

5 Claims, 4 Drawing Sheets

FRONTAL VEHICLE STRUCTURE AND METHOD FOR MANUFACTURING FRONTAL VEHICLE STRUCTURE

BACKGROUND

The present disclosure relates to a frontal vehicle structure and a method for manufacturing a frontal vehicle structure.

Japanese Laid-Open Patent Publication No. 10-53159 describes an example of a frontal vehicle structure. The frontal vehicle structure includes a bead and a bulged part that protrude from the wall surface of an apron member. The bulged part extends through the bead in the vertical direction on the wall surface of the apron member so that the opposite ends of the bulged part extend beyond the bead in the vertical direction. When the apron member receives an impact load acting in the front-to-rear direction, the bulged part allows for buckling of the apron member.

SUMMARY

It is an object of the present disclosure to provide a frontal vehicle structure and a method for manufacturing a frontal vehicle structure capable of limiting the deformation of a suspension tower toward the inner side of the passenger compartment when a frontal collision occurs.

Example 1

A frontal vehicle structure includes a front pillar, a front side member extending frontward from the front pillar, a suspension tower coupled to the front side member at a portion of the front side member located frontward from the front pillar, and a coupling member including a front end coupled to the suspension tower and a rear end coupled to the front pillar. The coupling member includes an outer panel and an inner panel that form a closed cross-sectional structure. The outer panel includes a weak portion arranged between a joined portion of the coupling member joined to the suspension tower and a joined portion of the coupling member joined to the front pillar.

In the above-described structure, the coupling member has the closed cross-sectional structure in which the outer panel and the inner panel are combined. Thus, the rigidity of the coupling member is kept during a normal time. Further, in a case in which a load is applied from the front when a frontal collision occurs in the vehicle, initial deformation starts from the weak portion, which is located in the outer panel between the joined portion of the coupling member joined to the suspension tower and the joined portion of the coupling member joined to the front pillar. Thus, the coupling member is deformed to project inward. This allows the suspension tower to fall outward and thus limits deformation of the suspension tower toward the inner side of the passenger compartment.

Example 2

In the frontal vehicle structure according to Example 1, the weak portion may be an inwardly-recessed recess located in the outer panel.

Example 3

In the frontal vehicle structure according to Example 1, the weak portion may be a through-hole extending through the outer panel.

Example 4

A coupling member in the frontal vehicle structure according to any one of examples 1 to 3 may be provided.

Example 5

A method for manufacturing the frontal vehicle structure according to any one of examples 1 to 3 may be provided.

In the present disclosure, the deformation of the suspension tower toward the inner side of the passenger compartment when a frontal collision occurs is reduced.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferable embodiments together with the accompanying drawings in which.

DETAILED DESCRIPTION

Figure 1:
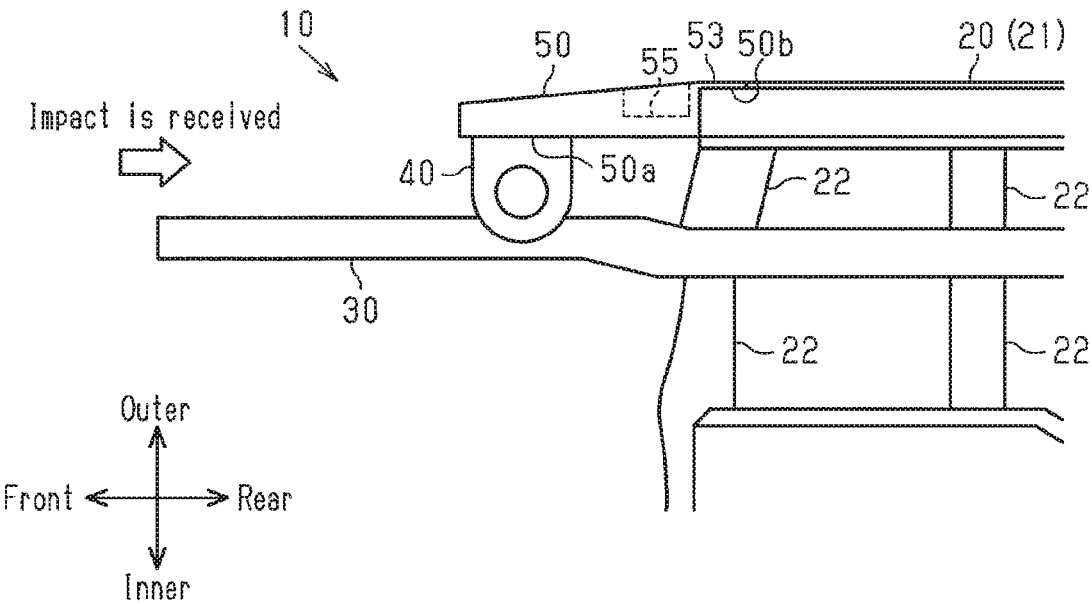
FIG. 1 is a plan view showing a frontal vehicle framework according to an embodiment.

An embodiment of the present disclosure will now be described with reference to FIGS. 1 to 8.

In the drawings, the "front" and "rear" refer to the front-rear direction of a vehicle, and the "inner" and "outer" respectively refer to the inner side and the outer side of the vehicle (passenger compartment). Further, the inner side and the outer side hereinafter respectively refer to the inner side of the passenger compartment and the outer side of the passenger compartment.

Figure 2:
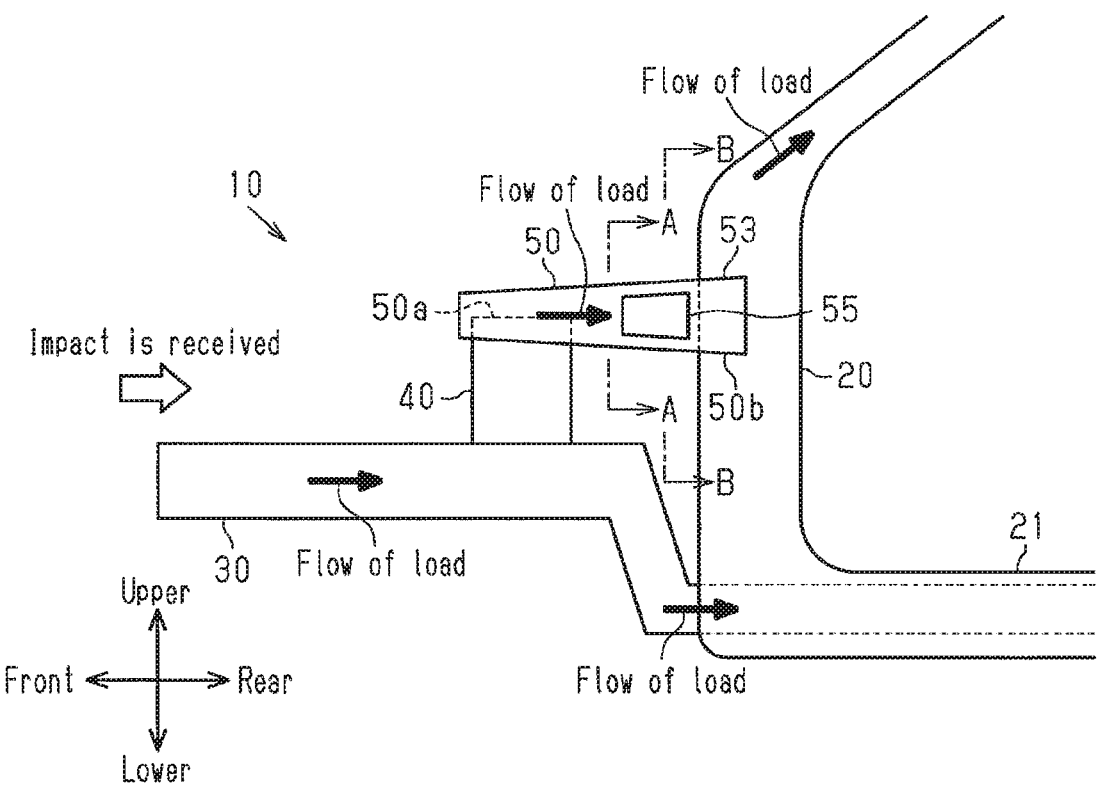
FIG. 2 is a side view showing the frontal vehicle framework of FIG. 1 according to the embodiment.

As shown in FIGS. 1 and 2, a frontal vehicle structure 10 includes a front pillar 20, a front side member 30, a suspension tower 40, and a cowl top side 50.

The lower end of the front pillar 20 is connected to the front end of a side sill 21. The front pillar 20 extends upward from the side sill 21. The front side member 30 extends frontward from the front pillar 20 and is located on the inner side of the front pillar 20 and the side sill 21. The front side member 30 is coupled to the side sill 21 by cross members 22.

The suspension tower 40 is coupled to the front side member 30 at a portion of the front side member 30 located frontward from the front pillar 20.

The cowl top side 50 is a coupling member. The front end of the cowl top side 50 is coupled to the suspension tower 40, and the rear end of the cowl top side 50 is coupled to the front pillar 20. The cowl top side 50 has a closed cross-sectional structure including an outer panel 51 and an inner panel 52.

Figure 3A:
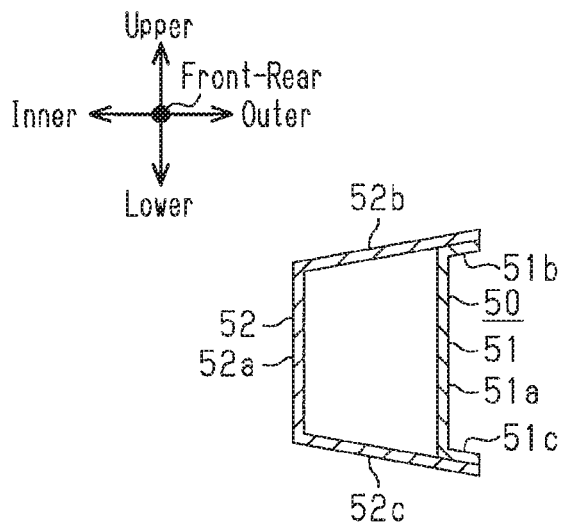
FIG. 3A is a cross-sectional view taken along line A-A in FIG. 2, showing a cowl top side.
Figure 3B:
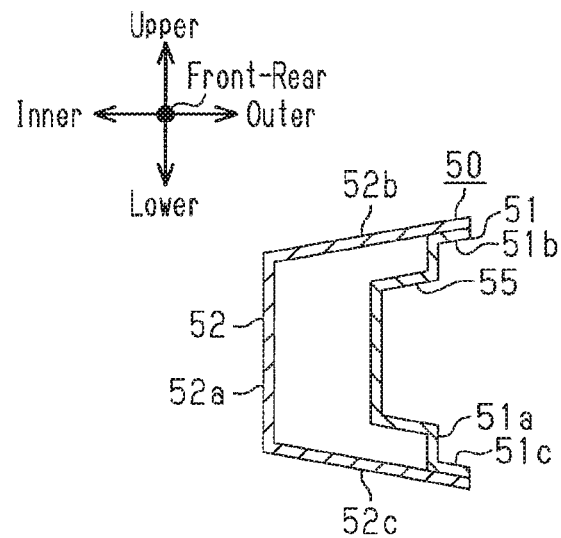
FIG. 3B is a cross-sectional view taken along line B-B in FIG. 2, showing the cowl top side.
Figure 3C:
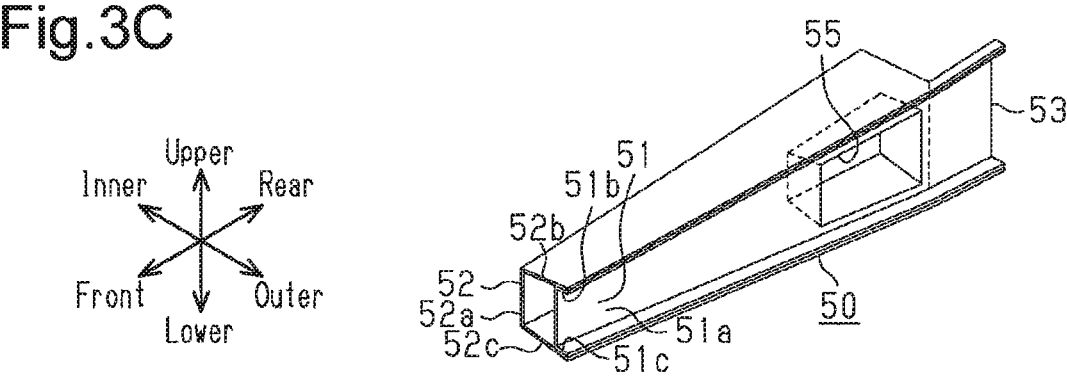
FIG. 3C is a perspective view showing the cowl top side.

More specifically, as shown in FIGS. 3A, 3B, and 3C, the cowl top side 50 has a box-shaped cross section. The cowl top side 50 includes the outer panel 51 and the inner panel 52, which are formed of metal plates. The outer panel 51 includes a vertical wall 51a extending in the vertical direction, an upper flange 51b extending diagonally upward and outward from the upper end of the vertical wall 51a, and a lower flange 51c extending diagonally downward and outward from the lower end of the vertical wall 51a. The inner panel 52 includes a vertical wall 52a extending in the vertical direction, an upper wall 52b extending diagonally outward and upward from the upper end of the vertical wall 52a, and a lower wall 52c extending diagonally outward and downward from the lower end of the vertical wall 52a.

As shown in FIG. 3A, the outer panel 51 is arranged to close the opening of the inner panel 52. The upper flange 51b of the outer panel 51 and the distal end of the upper wall 52b of the inner panel 52 are joined to each other in an overlapped state. The lower flange 51c of the outer panel 51 and the distal end of the lower wall 52c of the inner panel 52 are joined to each other in an overlapped state. The vertical wall 51a of the outer panel 51 and the vertical wall 52a of the inner panel 52 are spaced apart from each other. The space surrounded by the vertical wall 52a, the upper wall 52b, and the lower wall 52c of the inner panel 52 and by the vertical wall 51a of the outer panel 51 is a closed space.

As shown in FIG. 3C, the rear end of the outer panel 51 includes a protrusion 53 that protrudes rearward from the rear end of the inner panel 52. As shown in FIGS. 1 and 2, the protrusion 53 is joined to the outer surface of the front pillar 20. In addition, the front end of the vertical wall 52a of the inner panel 52 is joined to the suspension tower 40.

As shown in FIGS. 3B and 3C, the vertical wall 51a of the outer panel 51 of the cowl top side 50 includes an inwardly-recessed recess 55. In detail, the inwardly-recessed recess 55 serves as a weak portion and is located in the outer panel 51 between a first joined portion 50a of the cowl top side 50 joined to the suspension tower 40 and a second joined portion 50b of the cowl top side 50 joined to the front pillar 20. That is, the weak portion of the present embodiment is the inwardly-recessed recess 55 in the outer panel 51. It is preferred that the inwardly-recessed recess 55 be formed in the outer panel 51 on the rear side, that is, at a portion proximate to the second joined portion 50b, which is joined to the front pillar 20.

The operation of the present embodiment will now be described.

As shown in FIG. 3A, the cowl top side 50 has a closed cross-sectional structure in which the outer panel 51 and the inner panel 52 are combined. Thus, the rigidity of the cowl top side 50 is kept during a normal time, i.e., when a frontal collision does not occur.

Figure 4:
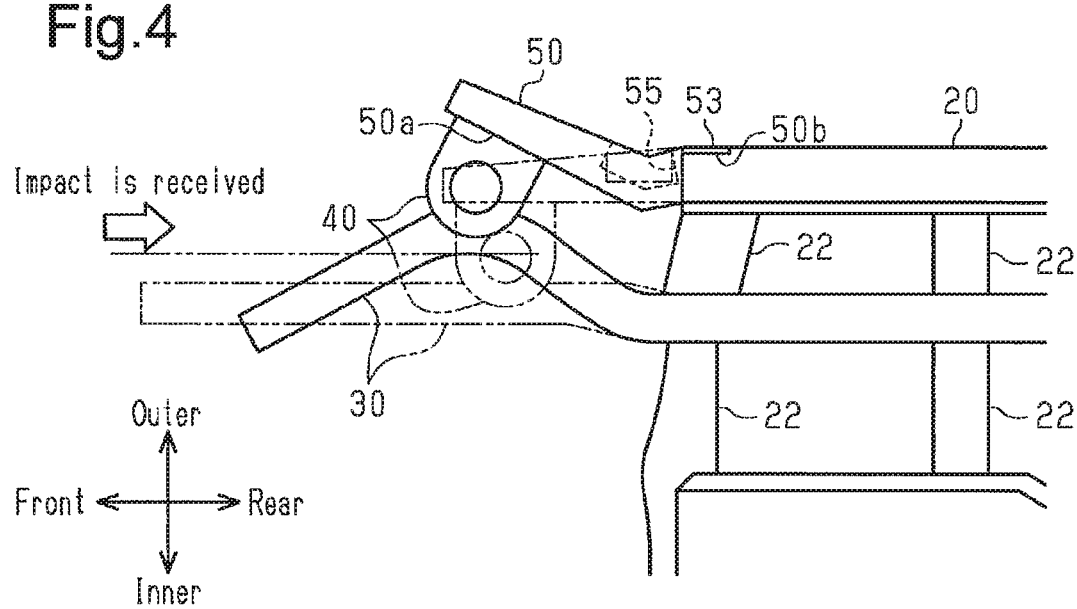
FIG. 4 is a plan view showing the frontal vehicle framework of FIG. 1.

As shown in FIG. 2, in a case in which a load is applied to the vehicle from the front when a frontal collision occurs, the load is transmitted from the front side member 30 through the cross members 22 to the side sill 21. Further, in a case in which a load is applied to the vehicle from the front when a frontal collision occurs, the load is transmitted from the front side member 30 through the suspension tower 40 and then through the cowl top side 50 to the front pillar 20. As shown in FIG. 4, initial deformation starts from the recess 55 of the cowl top side 50 in the flow of a load when a frontal collision occurs. This breaks the cowl top side 50 and thus deforms the cowl top side 50 to project inward. The deformation of the cowl top side 50 to project inward causes the suspension tower 40, which is hard, to fall outward. That is, the suspension tower 40 falls toward the side opposite to the inner side of the passenger compartment (the side opposite to the dash panel).

As shown in FIG. 4, the deformation of the cowl top side 50 to inwardly project the cowl top side 50 limits situations in which the suspension tower 40 falls inward, that is, falls toward the inner side of the passenger compartment (toward the dash panel). Thus, the suspension tower 40 avoids striking, for example, the air conditioner. That is, the arrangement of the recess 55 in the outer wall surface of the cowl top side 50 (the shaping of the outer wall surface of the cowl top side 50 to be recessed) crushes the recess 55 of the outer panel 51. This deforms the cowl top side 50 to project inward.

In the present embodiment, only the recess 55 is arranged in the outer panel 51 of the cowl top side 50. Thus, for example, as compared to when a separate reinforcement is used to limit deformation of the suspension tower 40 toward the inner side of the passenger compartment, the frontal vehicle structure of the present embodiment is not heavy and thus limits increases in mass.

In such a manner, in the present embodiment, the deformation mode of the cowl top side 50 is controlled to limit deformation of the suspension tower 40 toward the inner side of the passenger compartment.

Figure 6:
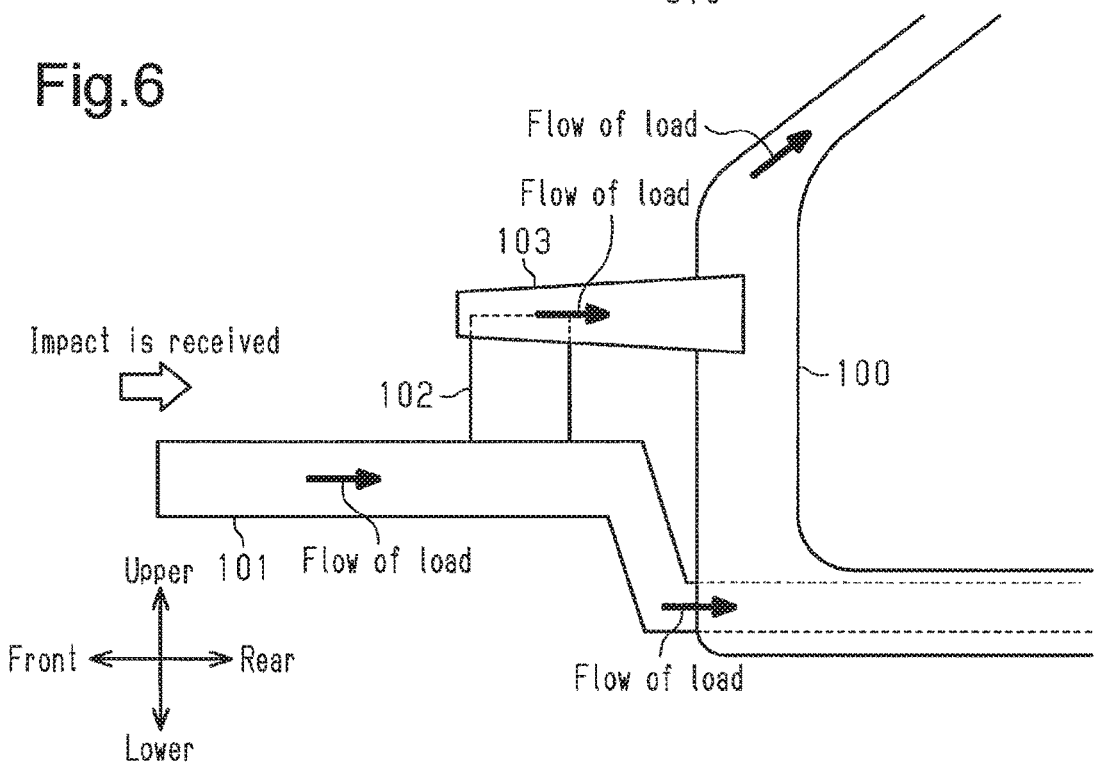
FIG. 6 is a side view showing a frontal vehicle framework to illustrate a comparative example.
Figure 7:
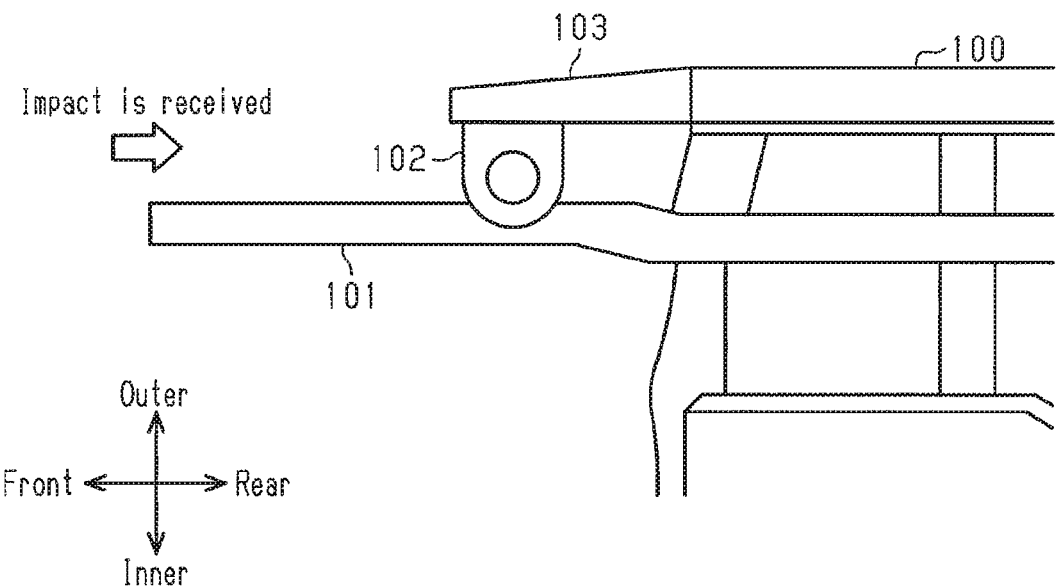
FIG. 7 is a plan view showing the frontal vehicle framework to illustrate the comparative example of FIG. 6.
Figure 8:
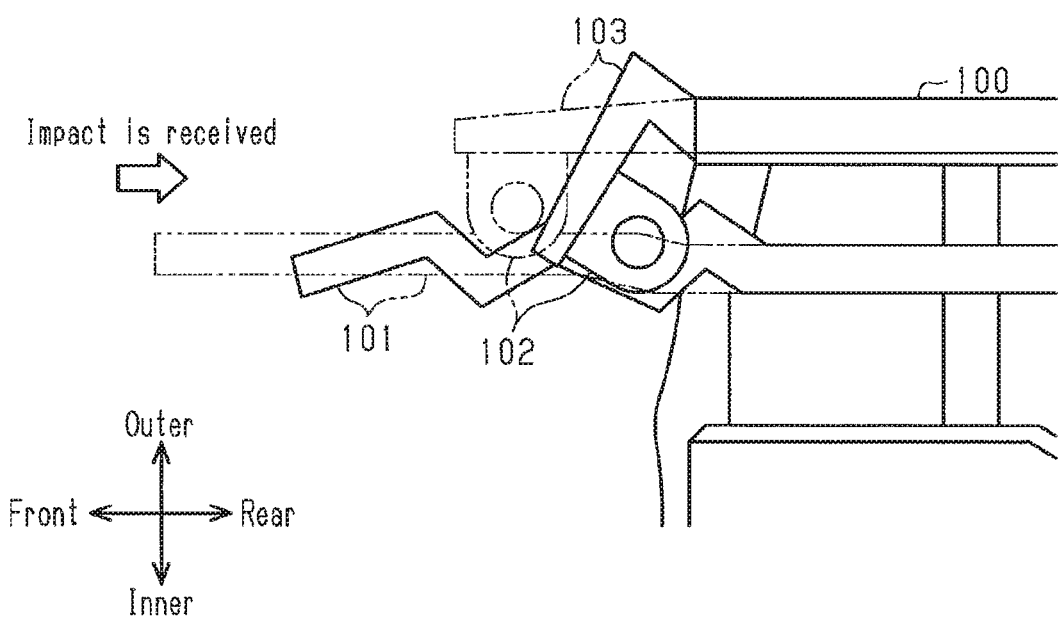
FIG. 8 is a plan view showing the frontal vehicle framework in the comparative example of FIG. 6 to illustrate the problem to be solved.

FIGS. 6 to 8 of the present application show a comparative example. In FIGS. 6 and 7, a front side member 101 extends frontward from a front pillar 100, and a suspension tower 102 is coupled to the front side member 101. The suspension tower 102 and the front pillar 100 are coupled to each other by a cowl top side 103. When a frontal collision occurs in the vehicle, the load from the front side member 101 is transmitted through the cowl top side 103 to the front pillar 100.

As shown in FIG. 8, in a case in which the deformation of the cowl top side 103 when a frontal collision occurs causes the cowl top side 103 to project toward the outer side of the passenger compartment, the suspension tower 102, which is hard, falls inward, i.e., falls toward the inner side of the passenger compartment. Such deformation can be limited in the above-described embodiment.

The above-described embodiment has the following advantages.

(1) The frontal vehicle structure 10 includes the front pillar 20, the front side member 30, which extends frontward from the front pillar 20, and the suspension tower 40, which is coupled to the front side member 30 at the portion of the front side member 30 located frontward from the front pillar 20. The frontal vehicle structure 10 further includes the cowl top side 50, which serves as the coupling member. The front end of the cowl top side 50 is coupled to the suspension tower 40, and the rear end of the cowl top side 50 is coupled to the front pillar 20. The cowl top side 50, serving as the coupling member, has a closed cross-sectional structure including the outer panel 51 and the inner panel 52. In the cowl top side 50, the outer panel 51 forming the outer wall surface includes the recess 55, which serves as the weak portion. The recess 55 is located in the outer panel 51 between the first joined portion 50a joined to the suspension tower 40 and the second joined portion 50b joined to the front pillar 20.

Since the cowl top side 50 has such a closed cross-sectional structure, the rigidity of the cowl top side 50 is kept during a normal time.

Further, in a case in which a load is applied from the front when a frontal collision occurs in the vehicle, the cowl top side 50 can be deformed to a desired shape. In detail, the cowl top side 50 can be deformed to project inward.

More specifically, initial deformation starts from the recess 55, which serves as the weak portion located in the outer panel 51 between the joined portion 50a of the cowl top side 50 joined to the suspension tower 40 and the joined portion 50b of the cowl top side 50 joined to the front pillar 20. Thus, the cowl top side 50 is deformed to project inward. This allows the suspension tower 40 to fall outward and thus limits deformation of the suspension tower 40 toward the inner side of the passenger compartment. In such a manner, the deformation mode of the cowl top side 50 when a frontal collision occurs in the vehicle is controlled to limit deformation of the suspension tower 40 toward the inner side of the passenger compartment when a frontal collision occurs.

(2) The weak portion is the inwardly-recessed recess 55 in the outer panel 51 and thus can be practically used.

It should be apparent to those skilled in the art that the present disclosure may be embodied in many other specific forms without departing from the spirit or scope of the disclosure. Particularly, it should be understood that the present disclosure may be embodied in the following forms.

The outer panel 51 of the cowl top side 50 includes one recess 55. Instead, the outer panel 51 of the cowl top side 50 may include recesses spaced apart from one another in the front-rear direction. That is, the cowl top side does not have to be broken at one part but may be broken at two or more parts.

Figure 5A:
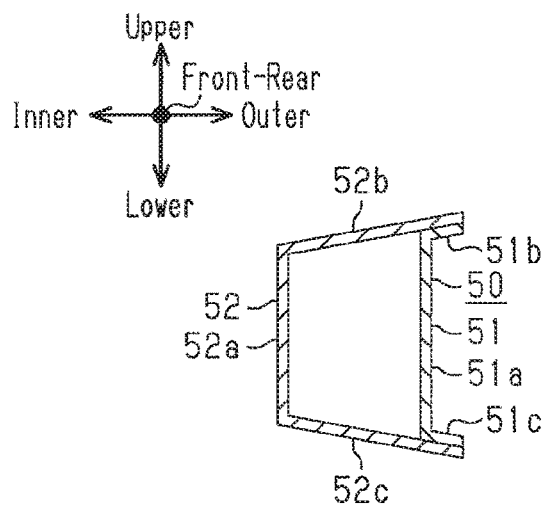
FIG. 5A is a cross-sectional view showing a cowl top side according to a further embodiment.
Figure 5B:
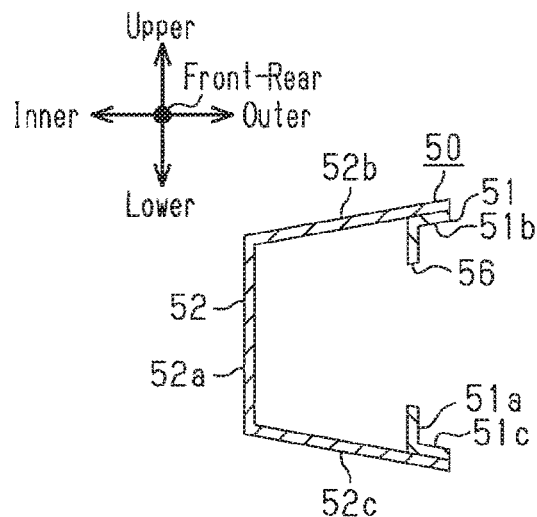
FIG. 5B is a cross-sectional view showing the cowl top side according to the further embodiment.
Figure 5C:
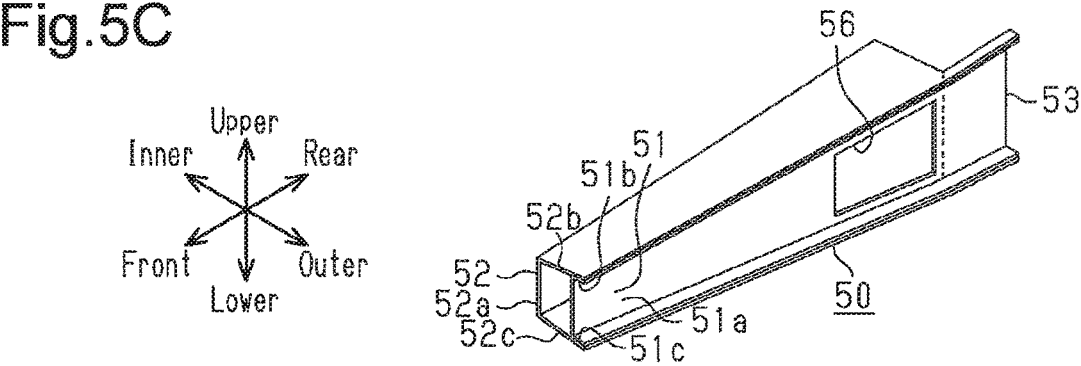
FIG. 5C is a perspective view showing the cowl top side according to the further embodiment.

As shown in FIGS. 3A, 3B, and 3C, the weak portion is the recess 55 formed in the outer panel 51 of the cowl top side 50. Instead, as shown in FIGS. 5A, 5B, and 5C, the weak portion may be a through-hole 56 extending through the outer panel 51 of the cowl top side 50. In this case, the outer panel 51 of the cowl top side 50 may also include recesses spaced apart from one another in the front-rear direction. That is, the cowl top side does not have to be broken at one part but may be broken at two or more parts.

Therefore, the present examples and embodiments are to be considered as illustrative and not restrictive and the disclosure is not to be limited to the details given herein, but may be modified within the scope and equivalence of the appended claims.

The invention claimed is:

1. A frontal vehicle structure, comprising:
a front pillar;
a front side member extending frontward from the front pillar;
a suspension tower coupled to the front side member at a portion of the front side member located frontward from the front pillar; and
a coupling member including a front end coupled to the suspension tower and a rear end coupled to the front pillar, wherein
the coupling member includes an outer panel and an inner panel that form a closed cross-sectional structure, and
the outer panel includes a weak portion arranged between a joined portion of the coupling member joined to the suspension tower and a joined portion of the coupling member joined to the front pillar.

2. The frontal vehicle structure according to claim 1, wherein the weak portion is an inwardly-recessed recess located in the outer panel.

3. The frontal vehicle structure according to claim 1, wherein the weak portion is a through-hole extending through the outer panel.

4. A coupling member for a frontal vehicle structure, the coupling member coupled to a suspension tower and a front pillar, the suspension tower coupled to a front side member at a portion of the front side member located frontward from the front pillar, the coupling member comprising:
an outer panel and an inner panel that form a closed cross-sectional structure;
a first joined portion joined to the suspension tower;
a second joined portion joined to the front pillar; and
a weak portion arranged in the outer panel between the first joined portion and the second joined portion.

5. A method for manufacturing a frontal vehicle structure, the method comprising:
providing a front pillar;
extending a front side member frontward from the front pillar;
coupling a suspension tower to the front side member at a portion of the front side member located frontward from the front pillar;
coupling a front end of a coupling member to the suspension tower;
coupling a rear end of a coupling member to the front pillar;
forming, by an outer panel and an inner panel of the coupling member, a closed cross-sectional structure; and
arranging a weak portion in the inner panel between a joined portion of the coupling member joined to the suspension tower and a joined portion of the coupling member joined to the front pillar.

* * * * *